US011561311B2

(12) United States Patent
LeBlanc et al.

(10) Patent No.: US 11,561,311 B2
(45) Date of Patent: Jan. 24, 2023

(54) SIMULTANEOUS ACQUISITION OF DISTRIBUTED ACOUSTIC SENSING FOR MONITORING

(71) Applicant: Halliburton Energy Services, Inc., Houston, TX (US)

(72) Inventors: Michel Joseph LeBlanc, Houston, TX (US); Andreas Ellmauthaler, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 750 days.

(21) Appl. No.: 16/495,525

(22) PCT Filed: Dec. 7, 2018

(86) PCT No.: PCT/US2018/064453
§ 371 (c)(1),
(2) Date: Sep. 19, 2019

(87) PCT Pub. No.: WO2020/117267
PCT Pub. Date: Jun. 11, 2020

(65) Prior Publication Data
US 2021/0199825 A1 Jul. 1, 2021

(51) Int. Cl.
*G01V 1/22* (2006.01)
*G01V 1/40* (2006.01)
(Continued)

(52) U.S. Cl.
CPC ............. *G01V 1/226* (2013.01); *G01H 9/004* (2013.01); *G01V 1/18* (2013.01); *G01V 1/40* (2013.01)

(58) Field of Classification Search
CPC ...... E21B 47/138; E21B 47/135; E21B 47/14; E21B 47/12; E21B 47/10; E21B 47/00;
(Continued)

(56) References Cited

U.S. PATENT DOCUMENTS 9,909,903 B2 * 3/2018 Lewis ................ G01D 5/35329
9,945,717 B2 * 4/2018 Lewis ...................... G01D 1/02
(Continued)

OTHER PUBLICATIONS

PCT Application Serial No. PCT/US2018/064453, International Search Report, dated Aug. 12, 2019, 3 pages.
(Continued)

*Primary Examiner* — John R Lee
(74) *Attorney, Agent, or Firm* — DeLizio, Peacock, Lewin & Guerra

(57) ABSTRACT

An apparatus comprises a distributed acoustic sensing (DAS) optical fiber, a DAS interrogator coupled to the DAS optical fiber, and a connector. The connector couples the DAS interrogator, a first digitizer, and a second digitizer, wherein the first digitizer is to generate a first digitized DAS signal based on an analog DAS signal from the DAS interrogator, and the second digitizer is to generate a second digitized DAS signal based on the analog DAS signal. The apparatus also comprises one or more processors and a machine-readable medium having program code executable to cause the apparatus to simultaneously generate a first set of values that correlate with a first physical property based on the first digitized DAS signal and generating a second set of values that correlate with a second physical property based on the second digitized DAS signal.

20 Claims, 9 Drawing Sheets

(51) Int. Cl.
*G01H 9/00* (2006.01)
*G01V 1/18* (2006.01)

(58) Field of Classification Search
CPC ............ G01H 9/00; G01H 9/004; G01V 1/40; G01V 1/226; G01V 1/22; G01V 1/18; G01V 1/00
See application file for complete search history.

(56) References Cited

U.S. PATENT DOCUMENTS

| | | | |
|---|---|---|---|
| 10,151,626 B2* | 12/2018 | Godfrey | G01D 5/35361 |
| 10,444,391 B2* | 10/2019 | Ellmauthaler | G01V 1/226 |
| 11,053,791 B2* | 7/2021 | Langnes | E21B 49/00 |
| 11,199,084 B2* | 12/2021 | Langnes | E21B 47/135 |
| 11,199,085 B2* | 12/2021 | Langnes | E21B 43/12 |
| 11,215,049 B2* | 1/2022 | Langnes | G01V 1/50 |
| 2014/0110124 A1 | 4/2014 | Goldner et al. | |
| 2016/0154142 A1 | 6/2016 | Stokely et al. | |
| 2017/0074688 A1* | 3/2017 | Crickmore | G01K 11/3206 |
| 2017/0130574 A1 | 5/2017 | Nunes et al. | |
| 2017/0260839 A1* | 9/2017 | Beardmore | E21B 47/07 |
| 2018/0058197 A1 | 3/2018 | Barfoot et al. | |
| 2018/0252098 A1 | 9/2018 | Johnston | |
| 2018/0328170 A1* | 11/2018 | Jaaskelainen | E21B 47/07 |
| 2019/0301276 A1* | 10/2019 | Jin | E21B 47/06 |
| 2020/0018149 A1* | 1/2020 | Luo | E21B 47/12 |
| 2020/0190971 A1* | 6/2020 | Thiruvenkatanathan | G01H 3/04 |
| 2020/0256834 A1* | 8/2020 | Langnes | E21B 47/10 |
| 2020/0271811 A1* | 8/2020 | Wilson | G01V 1/48 |
| 2021/0199825 A1* | 7/2021 | LeBlanc | G01V 1/18 |

OTHER PUBLICATIONS

PCT Application Serial No. PCT/US2018/064453, International Written Opinion, dated Aug. 12, 2019, 8 pages.

* cited by examiner

SIMULTANEOUS ACQUISITION OF DISTRIBUTED ACOUSTIC SENSING FOR MONITORING

BACKGROUND

The disclosure generally relates to the field of subsurface fault detection, and more particularly to subsurface fault detection based on seismic data interpretation.

Distributed acoustic sensing (DAS) signals are used for a variety of purposes. DAS signals are used to provide information during a seismic job. DAS signals can also be used to monitor a well during stimulation activities (e.g. for fracture monitoring). DAS signals are generated by a DAS interrogator connected to one or more DAS optical fibers (i.e. optical fiber capable of responding to acoustic waves, including dynamic strain coupled to the optical fiber from seismic waves propagating through rock formations or from waves propagating in wellbore fluids). During DAS monitoring, the DAS interrogator (either directly or through an intermediary device) transmits optical pulses to and receives optical signals from the DAS optical fiber. Optical signals received by the DAS interrogator are received as analog DAS signals and can be sent through a connector to another device.

BRIEF DESCRIPTION OF THE DRAWINGS

Embodiments of the disclosure may be better understood by referencing the accompanying drawings.

DESCRIPTION OF EMBODIMENTS

Figure 1:
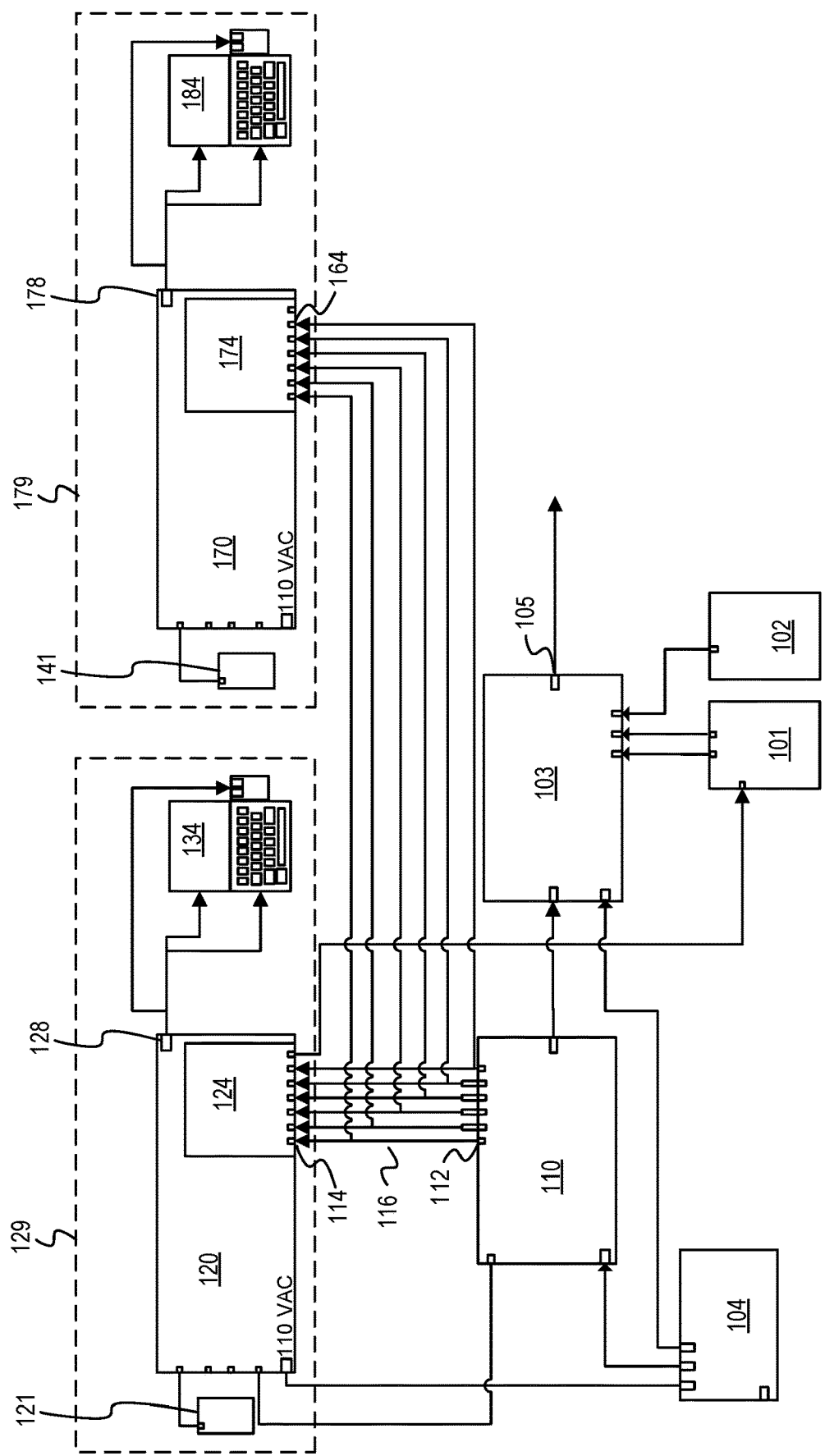
FIG. 1 depicts a schematic diagram of a simultaneous DAS signal acquisition system with a plurality of digitizers in different computing systems.

The description that follows includes example systems, methods, techniques, and program flows that embody embodiments of the disclosure. However, it is understood that this disclosure can be practiced without these specific details. For instance, this disclosure refers to processing digitized data using one or more processors that are in a same computing device as the digitizers that generated the digitized data. Aspects of this disclosure can instead be applied to processing digitized data using one or more processors that are not in the same computing device as the digitizers that generated the digitized data. In other instances, well-known instruction instances, protocols, structures and techniques have not been shown in detail in order not to obfuscate the description.

Various embodiments relate to a simultaneous DAS acquisition system whereby the same DAS interrogator is used to provide analog and timing signals to multiple digitizers, with each digitizer being used to provide digital signals to separate data acquisition and signal processing applications. The analog signals can be representative of the distributed detection of vibration signals along the optical fiber. The timing signals can be digital in nature and can consist of a fast clock signal (e.g. 100 MHz) to regulate the Analog to Digital data acquisition rate and a periodic trigger signal (e.g. 10 kHz) used to trigger the onset of a data acquisition frame. In a distributed fiber optic sensing system, each frame can correspond to the interrogation of the entire length of a fiber cable, and the acquisition clock speed can determine the spatial resolution of the measurement along the optical fiber. The one or more processors of a simultaneous DAS signal acquisition system can process each of the sets of digitized DAS signals to independently generate different sets of values that are correlated with one or more physical properties, wherein the one or more physical properties can include a property of the geological formation around the well, a property of a fluid flowing in the well, a property of equipment in the well, etc. The different sets of digitized DAS signals are based on the same set of analog DAS signals from a DAS interrogator and allow the simultaneous acquisition and processing of multiple types of information. This simultaneous acquisition can increase the accuracy of any formation evaluation, well stimulation monitoring, pressure transient testing, etc. Moreover, by reducing the number of DAS interrogators and/or DAS optical fibers used for the acquisition of multiple types of digitized DAS signals, the simultaneous DAS signal acquisition system reduces spatial requirements, reduces hardware costs, and increases the efficiency of well monitoring operations.

In some embodiments, the DAS signal acquisition system includes an optical fiber capable of sensing acoustic signals and a DAS interrogator coupled to the optical fiber. The DAS signal acquisition system also includes one or more connectors, wherein the connector(s) provide(s) a physical medium through which a DAS interrogator can transmit a set of analog DAS signals, as well as digital timing signals, to a plurality of digitizers. Each of the digitizers can generate digitized DAS signals based on the set of analog DAS signals and timing signals from the DAS interrogator. The DAS signal acquisition system can also include one or more processors to process the sets of digitized DAS signals into DAS values that correlate with physical properties.

In some embodiments, each of the plurality of digitizers can be coupled to a unique set of processors. For example, a first digitizer can be communicatively coupled to a first set of processors, and a second digitizer can be communicatively coupled to a second set of processors. During operation of the DAS signal acquisition system, each unique set of processors can transmit instructions (e.g. numeric values, strings, program code, etc.) to the DAS interrogator. The instructions can include instructions to configure the DAS interrogator (e.g. optical pulse width, periodic trigger signal rate, gauge length, etc.). In addition, the DAS interrogator can be locked with respect to one or more computing devices.

There are multiple options for the synchronization and regulation of timing of the data acquisition systems. In one embodiment, the DAS interrogator generates the fast clock and, with an internal counter, also determines when to generate a pulse which triggers the launch of a laser light pulse into the sensing optical fiber. Such signal features can include a rise in value, a decline in value, a local maximum, a local minimum, an absolute/relative amplitude value, etc. Both clock and trigger signals are fed to the digitizers which use these signals to regulate the start of acquisition (from the trigger pulse) and the rate of acquisition (from the clock pulse). In this embodiment, the two or more digitizers can use the DAS interrogator for the control of the timing. In another embodiment, the timing can be controlled and generated by one of the processors/computing devices (the master) attached to a digitizer, and this signal is then fed to the DAS interrogator and the one or more other master-controlled digitizers (slaves). The master timing signals can originate within the digitizer attached to the master processor or in a separate electronic board. When the timing signal originates in a board external to the digitizers, the timing signals can be fed to all of the digitizers simultaneously. In a third embodiment, the processor controlling the timing signals is separate from the processors connected to the digitizers, in which case the digitizers are "slaves".

Example Schematic Diagrams

FIG. 1 depicts a schematic diagram of a simultaneous DAS signal acquisition system with a plurality of digitizers in different computing systems. A universal power system (UPS) 104 is electrically coupled to and powers a computing system 129, a DAS interrogator 110, and a fiber stretcher module (FSM) 103. The UPS 104 can power one or more components with an alternating current at a voltage of 110 volts. The FSM 103 is communicatively coupled to an optical fiber 105, a seismic source controller system 101, a global positioning system (GPS) device 102, and the DAS interrogator 110. The DAS interrogator 110 is thus communicatively coupled to the optical fiber 105 via the FSM 103. A set of DAS ports 112 on the DAS interrogator 110 is communicatively coupled to a first set of digitizer ports 114 on a first digitizer 124 and to a second set of digitizer ports 164 on a second digitizer 174. In some embodiments, the UPS 104 can provide power using direct currents and/or currents at different voltages. The FSM can be used to convert the analog or digital signals from the seismic source controller (101) and GPS device (102) into dynamic strain signals applied to the fiber in the FSM.

The set of DAS ports 112 are connected to the first set of digitizer ports 114 using a set of connectors 116. The set of connectors 116 can be physical channels used to transmit analog and digital timing signals between the DAS interrogator and the digitizers. The set of connectors 116 can be electrically conductive metal wires, conductive polymers, or some other connectors capable of conducting electricity. In some embodiments, the set of connectors 116 can include one or more fiber optic cables using one or more devices capable of converting electrical signals to optical signals, and vice versa. In some embodiments, the set of connectors 116 can be replaced with a wireless information transmission system (using one or more devices to convert electrical signals to electromagnetic/radio signals, and vice versa). In some embodiments, the set of connectors 116 can include electrical wires for its ruggedness and cost-effectiveness. The set of DAS ports 112 are connected to the second set of digitizer ports 164 using the same set of connectors 116. A first computing device 120 is a part of the computing system 129 and includes the first digitizer 124. Likewise, a second computing device 170 is a part of the computing system 179 and includes the second digitizer 174. The second computing device 170 is also communicatively coupled to an external memory 141. Likewise, the first computing device 120 is also communicatively coupled to an external memory 121. A user communication port 128 on the first computing device 120 is connected to a display and control system 134, which is also a part of the computing system 129. Likewise, a user communication port 178 on the second computing device 170 is connected to a display and control system 184, which is also a part of the computing system 179. In some embodiments, the display and control system 134 and/or the display and control system 184 can comprise at least one display device such as a digital display monitor, light emitting diode display board, electronic tablet, holographic display system, etc.

During operations of the DAS interrogator 110, the DAS interrogator 110 can control the FSM 103, which can transmit optical pulses to and receive optical signals from the optical fiber 105. In embodiments without the FSM 103, the DAS interrogator 110 can directly transmit optical pulses and receive optical signals from the optical fiber 105. Optical signals received from the optical fiber 105 can be received as analog DAS signals and can be processed, filtered, or augmented using signals from the seismic controller 101 and the GPS device 102. While receiving and detecting the optical signal, the DAS interrogator 110 simultaneously transmits analog DAS signals to the first digitizer 124 and to the second digitizer 174 through the set of connectors 116. The first digitizer 124 can transmit a set of digitized DAS signals to a processor in the first computing device 120, which can then provide a first set of values to the display and control system 134 through the user communication port 128. The first set of values can be correlated with a first physical property. The second digitizer 174 can transmit a second set of digitized DAS signals to a processor in the second computing device 170, which can then provide a second set of values to the display and control system 184 through the user communication port 178. The second set of values can be correlated with a second physical property. In addition, the first set of values and the second set of values can be combined to determine a third set of properties.

Control signals from the first computing device 120 provide instructions to the DAS interrogator 110 to start, modify, and/or end operations of the DAS interrogator 110. In some embodiments, control signals from the second computing device 170 can also provide instructions to the DAS interrogator 110 to start, modify, and/or end operations of the DAS interrogator 110. Various schemes can be employed that allow for non-contradictory control of the DAS interrogator 110 by either the first computing device 120 or the second computing device 170. One scheme to control the DAS interrogator 110 can include a digital locking mechanism wherein the DAS interrogator 110 can be locked or unlocked with respect to any of the computing devices coupled with the DAS interrogator 110. When the DAS interrogator 110 is unlocked with respect to a computing device (or a processor in the computing device), the DAS interrogator 110 is controllable by that respective computing device. For example, a DAS interrogator 110 that is unlocked with respect to the first computing device 120 is controllable by the first computing device 120. When the DAS interrogator 110 is locked with respect to a computing device, the DAS interrogator 110 either ignores instructions from that respective computing device or does not receive instructions from that respective computing device. For example, if the DAS interrogator 110 is locked with respect to the first computing device 120, the DAS interrogator 110 can ignore instructions from the first computing device 120. In some embodiments, whether the DAS interrogator 110 is locked or unlocked with respect to a particular computing device can be based on the computing device that had last sent instructions to the DAS interrogator 110. For example, the DAS interrogator 110 can be unlocked with respect to the first computing device 120 and locked with respect to the second computing device 170 after receiving a set of instructions from the first computing device 120. In some embodiments, a computing device can send a set of instructions to a DAS interrogator 110 that overrides a locked state. For example, if the DAS interrogator 110 is locked with respect to the first computing device 120, the first computing device 120 can transmit a set of instructions to the DAS interrogator 110 that overrides the lock and allows the DAS interrogator 110 to start, modify, and/or end operations based on the instructions from the first computing device 120. In yet another embodiment, a third processor, not connected to any of the digitizers, is used to provide control instructions to the DAS interrogator and to the processors connected to the digitizers and acts as master controller.

Figure 2:
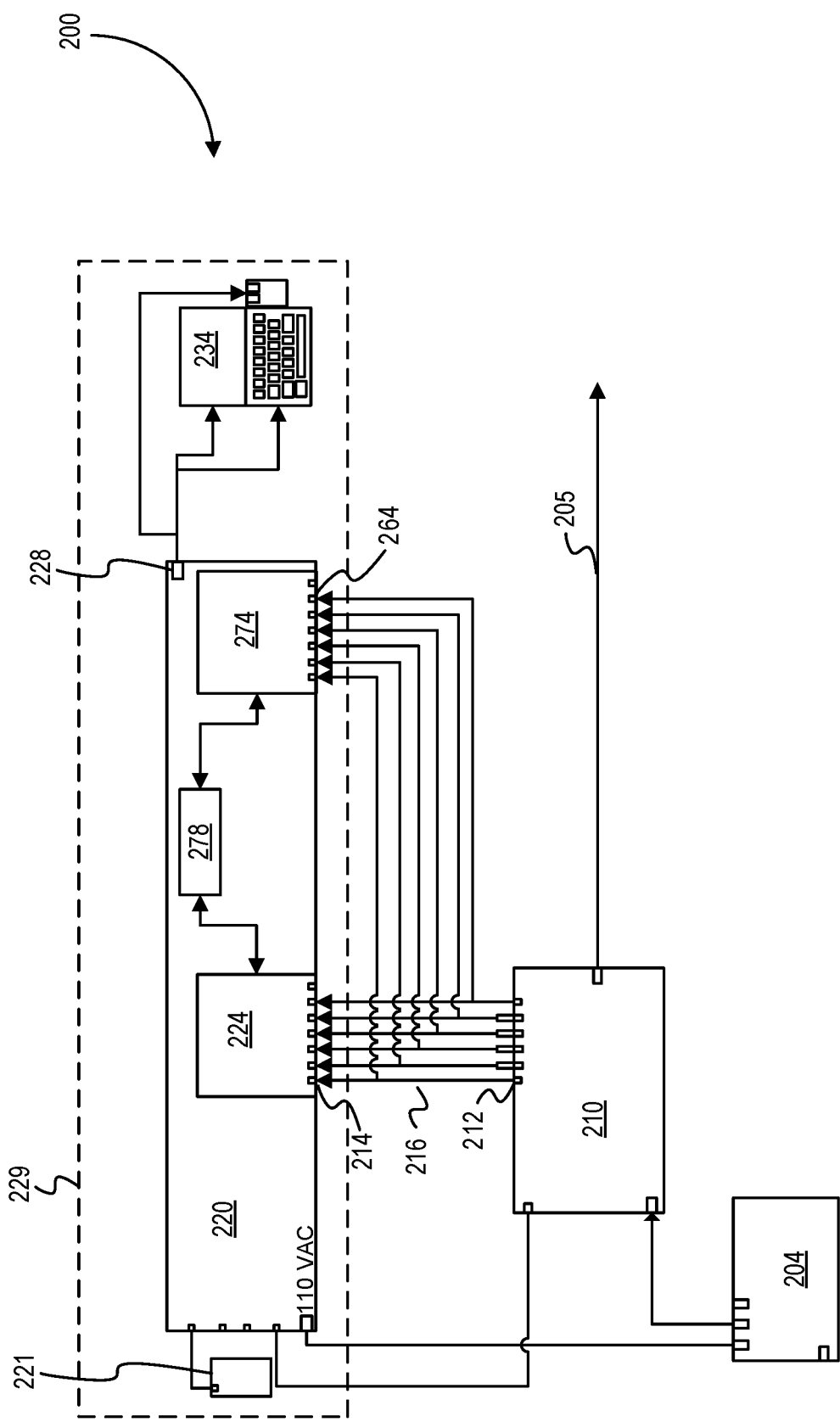
FIG. 2 depicts a schematic diagram of a simultaneous DAS signal acquisition system with a plurality of digitizers in the same computing system.

FIG. 2 depicts a schematic diagram of a simultaneous DAS signal acquisition system with a plurality of digitizers in the same computing system. A UPS 204 is electrically coupled to and powers a computing system 229 and a DAS interrogator 210. The DAS interrogator 210 is directly communicatively coupled to an optical fiber 205. Alternatively, instead of being directly coupled to the optical fiber 205, a FSM can be coupled between the DAS interrogator 210 and the optical fiber 205. A set of DAS ports 212 on the DAS interrogator 210 is communicatively coupled to a first set of digitizer ports 214 on a first digitizer 224 and to a second set of digitizer ports 264 on the second digitizer 274. The set of DAS ports 212 are connected to the first set of digitizer ports 214 using a set of connectors 216. The set of DAS ports 212 are connected to the second set of digitizer ports 264 using the same set of connectors 216. A computing device 220 is a part of the computing system 229 and includes both the first digitizer 224 and the second digitizer 274. A clock sync system 278 in the computing device 220 is communicatively coupled to both the first digitizer 224 and the second digitizer 274. The computing device 220 is also communicatively coupled to an external memory 221. A communication port 228 on the computing device 220 is connected to a display and control system 234. In some embodiments, the display and control system 234 can comprise at least one display device such as a digital display monitor, light emitting diode display board, tablet, holographic display system, etc.

During operations of the DAS interrogator 210, the DAS interrogator 210 can transmit optical pulses to and receive optical signals from the optical fiber 205. An optical signal received from the optical fiber 205 can be received as an analog DAS signal. After receiving the analog DAS signal, the DAS interrogator 210 simultaneously transmits the analog DAS signal to the first digitizer 224 and to the second digitizer 274 through the set of connectors 216. Both the first digitizer 224 and the second digitizer 274 then generate a set of digitized DAS signals based on the analog DAS signal.

In some embodiments, the clock sync system 278 can trigger signals to be shared between each of the digitizers. In some embodiments, the clock sync system can synchronize sets of digitized DAS signals such that simultaneous signal features are within 5 nanoseconds of each other or less. In addition, control signals from the computing device 220 can provide instructions to the DAS interrogator 210 to start, modify, and/or end operations of the DAS interrogator 210. As was the case for the system of FIG. 1, the clock and trigger signals can be generated by the DAS system itself, or by one of the digitizers acting as a master and other as slave.

In alternative embodiments, the DAS interrogator 210 can be coupled to a third digitizer. For example, the DAS interrogator 210 can be coupled to a third digitizer in the computing device 220 by modifying the connector 216 to include a fourth set of ends that connect with the third digitizer. Alternatively, the DAS interrogator 210 can be coupled to a third digitizer in a second computing device that is physically separate from the computing device 220, wherein the third digitizer can generate a third set of digitized DAS signals, and wherein a third set of values based on the third set of digitized DAS signals can be displayed on a second display and control system.

Example Flowcharts

The flowcharts below are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order or simultaneously. For example, with reference to FIG. 3 below, the operations depicted in blocks 304-316 can be performed in parallel or concurrently. With respect to FIG. 4, a determination of whether a clock sync system is available is not necessary. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

Figure 3:
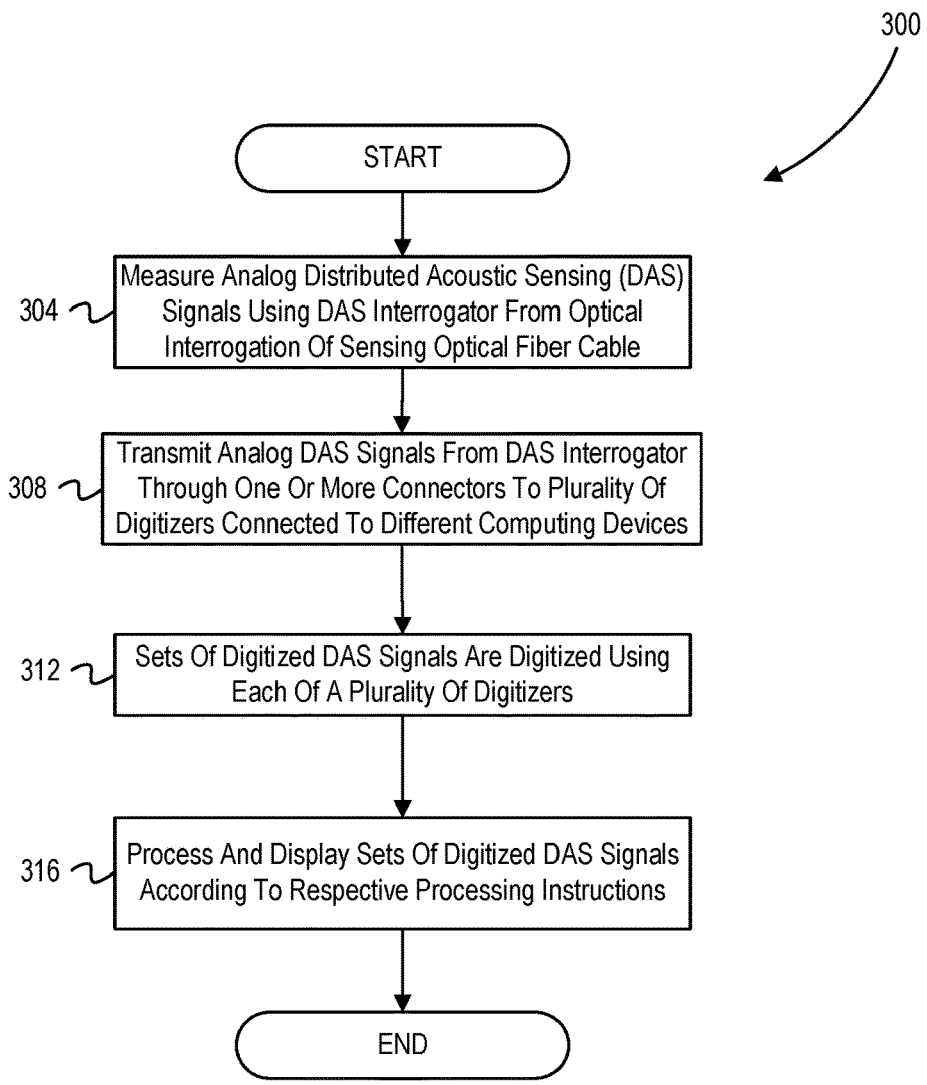
FIG. 3 depicts a flowchart of operations to simultaneously transmit DAS signals to a plurality of digitizers in different computing systems.

FIG. 3 depicts a flowchart of operations to simultaneously transmit DAS signals to a plurality of digitizers in different computing systems. Operations of the flowchart 300 can be performed by a system including a DAS interrogator, digitizers, and one or more processors. For example, with reference to FIG. 1, operations of the flowchart 300 can be performed by a simultaneous DAS signal acquisition system including the DAS interrogator 110, the first digitizer 124, the second digitizer 174, and one or more processors. Operations of the flowchart 300 begin at block 304.

At block 304, analog DAS signals are measured using a DAS interrogator from optical interrogation of the sensing optical fiber cable. The DAS interrogator can continuously function by measuring optical signals and outputting electrical signals via its electrical signal connections. The analog DAS signals can include analog signals of in-phase (I) and quadrature (Q) modulated, distributed Rayleigh backscattering interferometric signals. For example, with reference to FIG. 1, analog DAS signals can be measured by the DAS interrogator 110. In addition, the DAS interrogator can also transmit (if master) or receive (if slave) clock and trigger digital timing signals.

At block 308, analog DAS electrical signals are transmitted from the DAS interrogator to a plurality of digitizers connected to different computing devices through one or more connectors. The DAS interrogator can transmit the analog DAS signals in the form of electric signals to two or more digitizers using a set of connectors. For example, with reference to FIG. 1, the DAS interrogator 110 can transmit DAS signals to the first digitizer 124 and the second digitizer 174 using the set of connectors 116.

At block 312, sets of digitized DAS signals are digitized using each of the plurality of digitizers. Each of the plurality of digitizers can digitize the DAS signals based on a distinct set of digitization parameters. For example, with reference to FIG. 1, the first digitizer 124 can generate a first set of digitized DAS signals based on parameters adapted for generating a vertical seismic profile (VSP), and the second digitizer 174 can generate a second set of digitized DAS signals based on parameters adapted for micro-seismic monitoring. For example, for the VSP, the DAS system may use an acquisition frequency of 1 kHz for generating the VSP but use an acquisition frequency of 10 kHz for flow monitoring. In such a case, the DAS interrogator can be configured to interrogate the optical fiber at 10 kHz and produce the corresponding analog signals on its output connector 116. These signals are used on a continuous basis by the digitizer connected to the flow monitoring computing device. However, the DAS VSP digitizer is configured to ignore inputs to the trigger signal until a period corresponding to slightly more than 9 scans has expired. This allows the DAS VSP system to process $\frac{1}{10}^{th}$ of the frames generated by the DAS interrogator. Alternatively, or in addition, digitizers can digitize analog DAS signals based on parameters adapted for temperature sensing, pressure sensing, flow modeling, etc. Digitization parameters can include a sampling speed, a full-scale voltage range, a number of quantization bits, etc. Each of the aforementioned digitization parameters can be used in operations that are performed independently by the digitizers of differing computer systems.

At block 316, the sets of digitized DAS signals are processed and displayed according to their respective processing instructions. One or more processors can process the digitized DAS signals based on instructions stored in computer-readable media, and can provide processed sets of values correlated with physical properties such as VSP values, micro-seismic values, distributed temperature sensing (DTS) values, distributed pressure sensing values, fluid flow values, etc. A set of values can be displayed on a display device in various forms such numbers, graphs, images, and/or multi-dimensional computer-generated models. For example, with reference to FIG. 1, flow-monitoring values based on digitized DAS signals from the first digitizer 124 can be displayed on the display and control system 134 while DTS values based on digitized DAS signals from the second digitizer 174 can be simultaneously processed and displayed on the display and control system 184. In addition, the different sets of values can be processed differently, such that one set of value can be displayed and another set of values can be used to support operational decisions at a well system. For example, with reference to FIG. 1, flow-monitoring values based on digitized DAS signals from the first digitizer 124 can be displayed on the display and control system 134 while DTS values based on digitized DAS signals from the second digitizer 174 can be simultaneously processed to determine if a gas has reached the wellbore and modify the flow of fluids into and out of the wellbore.

Figure 4:
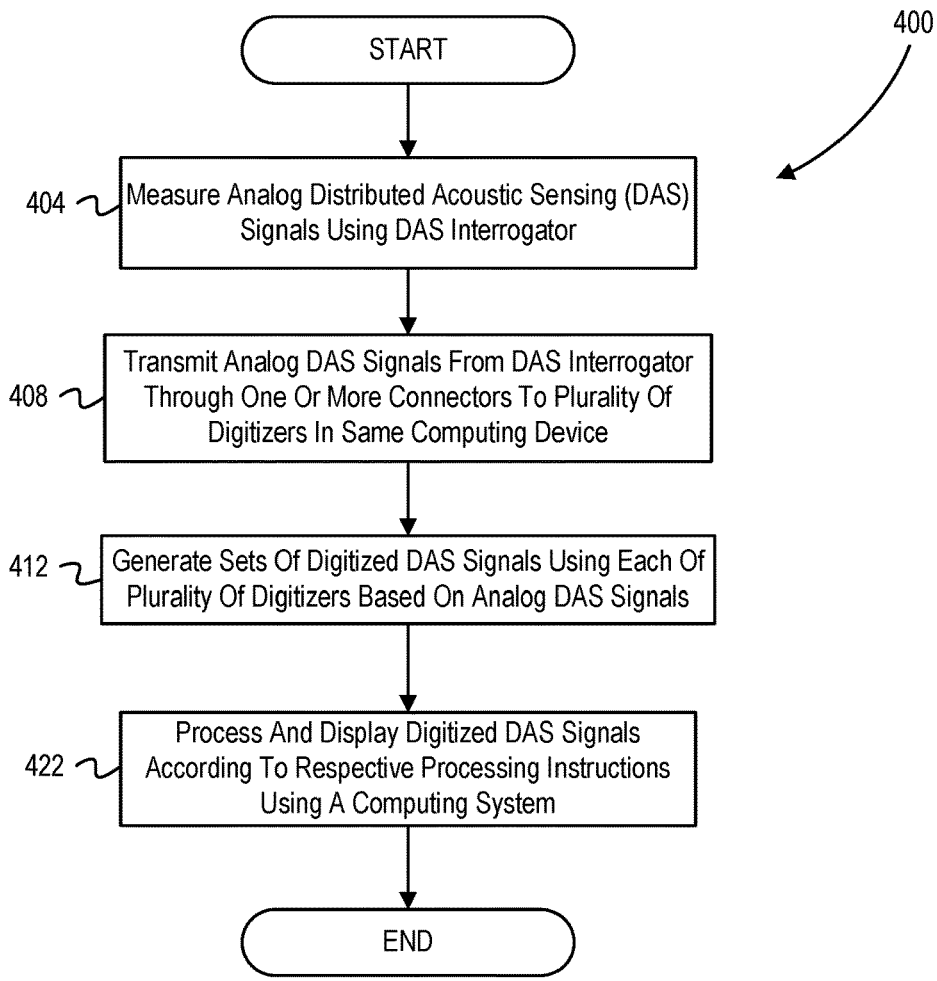
FIG. 4 depicts a flowchart of operations to simultaneously transmit DAS signals to a plurality of digitizers in the same computing system.

FIG. 4 depicts a flowchart of operations to simultaneously transmit DAS signals to a plurality of digitizers in the same computing system. Operations of the flowchart 400 can be performed by a system including a DAS interrogator, digitizers, and one or more processors. For example, with reference to FIG. 2, operations of the flowchart 400 can be performed by a system including the DAS interrogator 210, the first digitizer 224, the second digitizer 274, and one or more processors. Operations of the flowchart 400 begin at block 404.

At block 404, analog DAS signals are measured using a DAS interrogator. The DAS interrogator can continuously function by measuring and outputting signals via its electrical signal connections. The analog DAS signals can include analog signals of in-phase (I) and quadrature (Q) modulated, distributed Rayleigh backscattering interferometric signals. For example, with reference to FIG. 2, analog DAS signals can be measured by the DAS interrogator 210. In addition, the DAS interrogator can also transmit (if master) or receive (if slave) clock and trigger digital timing signals.

At block 408, analog DAS signals are transmitted from the DAS interrogator to a plurality of digitizers in a same computing device through one or more connectors. The DAS interrogator can transmit the analog DAS signals in the form of electric signals to two or more digitizers using a set of connectors. For example, with reference to FIG. 2, the DAS interrogator 210 can transmit analog DAS signals to the first digitizer 224 and the second digitizer 274 using the set of connectors 216.

At block 412, sets of digitized DAS signals are generated using the each of the plurality of digitizers based on the analog DAS signals. Each of the plurality of digitizers can digitize the analog DAS signals into digitized DAS signals based on a distinct set of digitization parameters. For example, with reference to FIG. 2, the first digitizer 224 can generate a first set of digitized DAS signals based on parameters adapted for generating a vertical seismic profile (VSP), and the second digitizer 274 can generate a second set of digitized DAS signals based on parameters adapted for micro-seismic monitoring. Alternatively, or in addition, digitizers can digitize analog DAS signals based on parameters adapted for temperature sensing, pressure sensing, flow modeling, etc. As was the case for FIG. 4, one digitizer can be set to ignore a subset of frames generated by the DAS interrogator so as to operate at a reduced frame rate compared to the other digitizer.

At block 422, digitized DAS signals are processed and displayed using a computing system according to their respective processing instructions. The digitized DAS signals are processed based on instructions stored in computer-readable non-transitory media, and can provide sets of values for VSP, micro-seismic data, distributed temperature sensing (DTS) profile, distributed pressure sensing profile, fluid flow monitoring, etc. Any combination of processed data can be displayed simultaneously on multiple display devices in various forms such as in numbers, graphs, images, and/or multi-dimensional topological computer models. For example, with reference to FIG. 2, flow-monitoring data provided by the digitized signal from the first digitizer 224 can be processed and displayed on the display and control system 234 while a DTS profile provided by the digitized signal from the second digitizer 274 can be simultaneously processed and displayed on the same display and control system 234. In addition, the different sets of values can be processed differently, such that one set of value can be displayed and another set of values can be used to support operational decisions at a well system. For example, with reference to FIG. 2, a DTS profile provided by the digitized signal from the second digitizer 274 can be processed and displayed on the display and control system 234 while flow-monitoring data provided by the digitized signal from the first digitizer 224 can be simultaneously processed to determine if a fracture has occurred in a formation and modify a fluid pressure based on the determination that a fracture has occurred.

Figure 5:
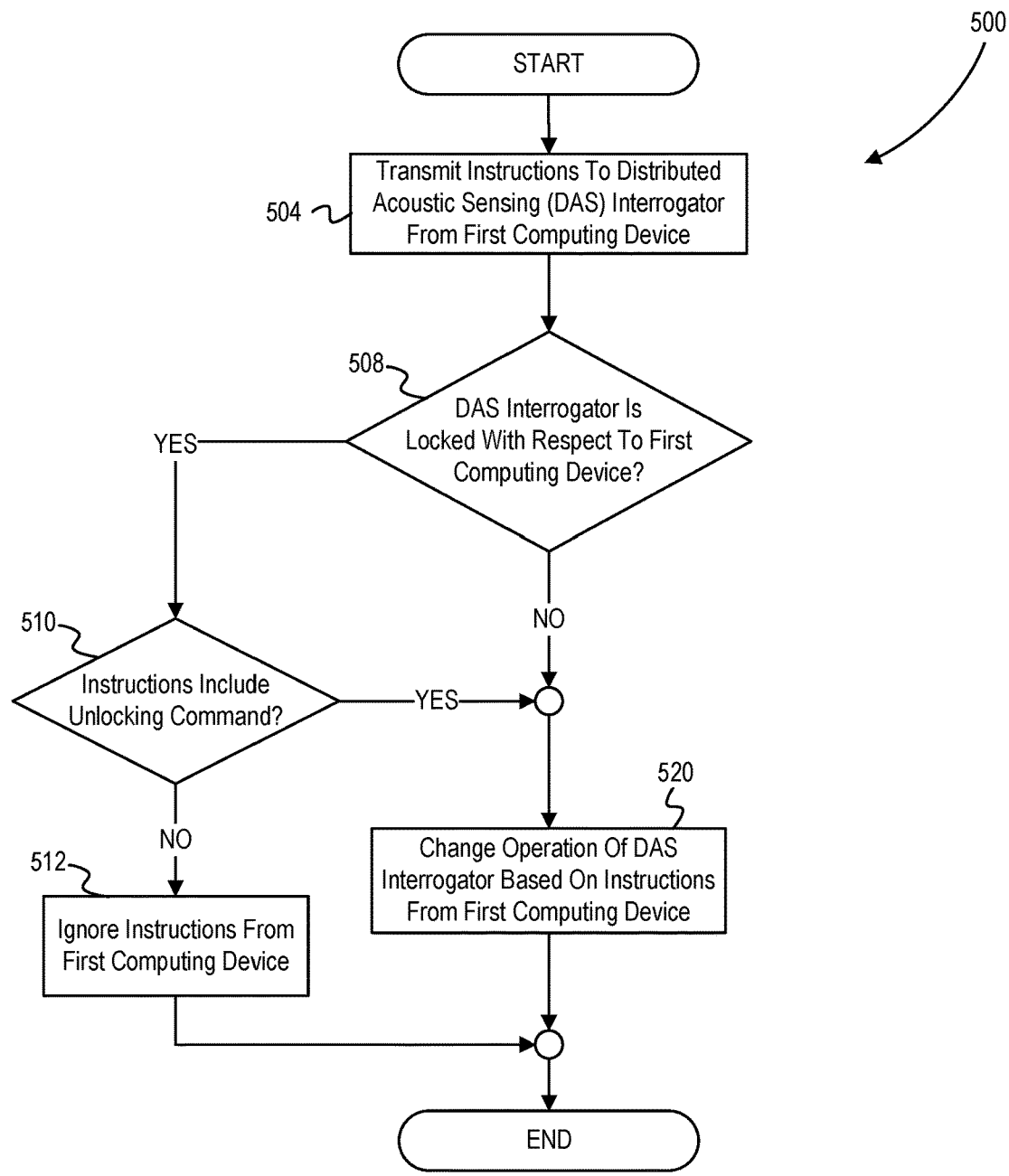
FIG. 5 depicts a flowchart of operations to process instructions to a same DAS interrogator from different computing systems.

FIG. 5 depicts a flowchart of operations to process instructions to a same DAS interrogator from different computing systems. Operations of the flowchart 400 can be performed by a system including a DAS interrogator, digitizers, and one or more processors. For example, with reference to FIG. 1, operations of the flowchart 400 can be performed by a system including the DAS interrogator 110, the first digitizer 124, the second digitizer 174, and one or more processors. Operations of the flowchart 500 begin at block 504.

At block 504, a first computing device transmits instructions to a DAS interrogator. The first computing device can transmit various instructions to begin operations, modify operations, stop operation, prevent other computing devices from changing operations of the DAS interrogator, etc. For example, with reference to FIG. 1, the first computing device 120 can transmit instructions to the DAS interrogator 110. The instructions can include instructions to modify a frequency, width, shape and amplitude of an optical signal sent through the optical fiber 105 or to apply a distinct set of parameters to measure any optical signal received from the optical fiber 105. The instructions can also include instructions to override a lock the DAS interrogator 110 has with respect to the first computing device and/or unlock the DAS interrogator 110 with respect to the first computing device 120.

At block 508, a determination is made of whether the DAS interrogator is locked with respect to the first computing device. The DAS interrogator can be "locked" with respect to the first computing device at block 508 when a variable or set of variables stored in computer-readable storage media that is communicatively coupled to the DAS interrogator 110 indicate that the DAS interrogator is "locked" with respect to a computing device. If the DAS interrogator is locked with respect to the first computing device, flow proceeds to block 510. Otherwise, flow proceeds to block 520 in the case that the DAS interrogator is not locked with respect to the first computing device.

At block 510, a determination is made of whether the instructions sent to the DAS interrogator include an unlocking command. In some embodiments, the instructions sent to the DAS interrogator can include an "unlocking" command that overrides previous instructions or default settings that lock the DAS interrogator with respect to the first computing device. If the instructions sent to the DAS interrogator include an unlocking command, operations of the flowchart 500 proceed to block 520. Otherwise, operations of the flowchart 500 proceed to block 512.

At block 512, the DAS interrogator ignores the instructions from the first computing device. In some embodiments, a DAS interrogator that is locked with respect to a first computing device can be set to ignore the instructions from the first computing device. For example, with reference to FIG. 1, instructions from the first computing device 120 to the DAS interrogator 110 can include instructions to change a gauge length the DAS interrogator uses to measure DAS signals. In response to the DAS interrogator 110 being locked with respect to the first computing device 120, the DAS interrogator 110 can leave the gauge length unchanged.

Block 520 can be reached if the DAS interrogator is not locked with respect to the first computing device, or if the DAS interrogator was locked, and the instructions from the first computing device included an unlocking command. At block 520, operation of the DAS interrogator is changed based on instructions from the first computing device. Changing the operation of a DAS interrogator can include changing a measurement gauge length, a measurement sampling rate, optical signal wavelength, optical signal amplitude, optical signal width, etc. In addition, changing the operations of a DAS interrogator can include cycling through different sets of parameters for the operation of the DAS interrogator and interleaving the different sets of parameters in a sequence. For example, with reference to FIG. 1, the instructions sent by the first computing device 120 to the DAS interrogator 110 can include interleaving a first set of parameters and a second set of parameters in a timed sequence such that each set of parameters are applied to the operation of the DAS interrogator 110 in 30 millisecond intervals. Alternatively, or in addition, the instructions sent by first computing device 120 to the DAS interrogator 110 can include a set of parameters that produce sets of non-interfering analog DAS signals. In addition, the DAS interrogator can be locked with respect to other computing devices. For example, with reference to FIG. 1, after receiving a signal from the first computing device 120, the DAS interrogator can be locked with respect to the second computing device 170.

In some embodiments, the settings of the DAS interrogator can be optimized to increase a signal to noise ratio and/or maximize a signal acquisition speed. For example, an optical pulse repetition speed can be selected based on a signal to noise ratio threshold, wherein the signal to noise ratio of at least one of the digitized signals is greater than or equal to the signal to noise ratio threshold. Likewise, an optical pulse repetition speed can be selected based on a signal acquisition speed, wherein the signal acquisition speed of at least one of the digitized signals is greater than or equal to acquisition speed threshold. In some embodiments, the optical pulse repetition speed can be selected such that both the signal to noise ratio of at least one of the digitized signals is greater than or equal to the signal to noise ratio threshold and the signal acquisition speed of at least one of the digitized signals is greater than or equal to acquisition speed threshold.

In some embodiments, settings such as the gauge length can be selected based on a first gauge length limit and a second gauge length limit. The first gauge length limit can be determined based on an optimal gauge length for measuring a first physical property. The second gauge length limit can be determined based on an optimal gauge length for measuring a second physical property. For example, if a first gauge length limit is determined to be 20 meters based on 20 meters being an optimal gauge length for measuring acoustic changes and a second gauge length limit is determined to be 10 meters based on 10 meters being an optimal gauge length for measuring temperature, the DAS interrogator can be modified such that a gauge length for the DAS interrogator is selected to be between 10 meters and 20 meters.

Example Well System

Figure 6:
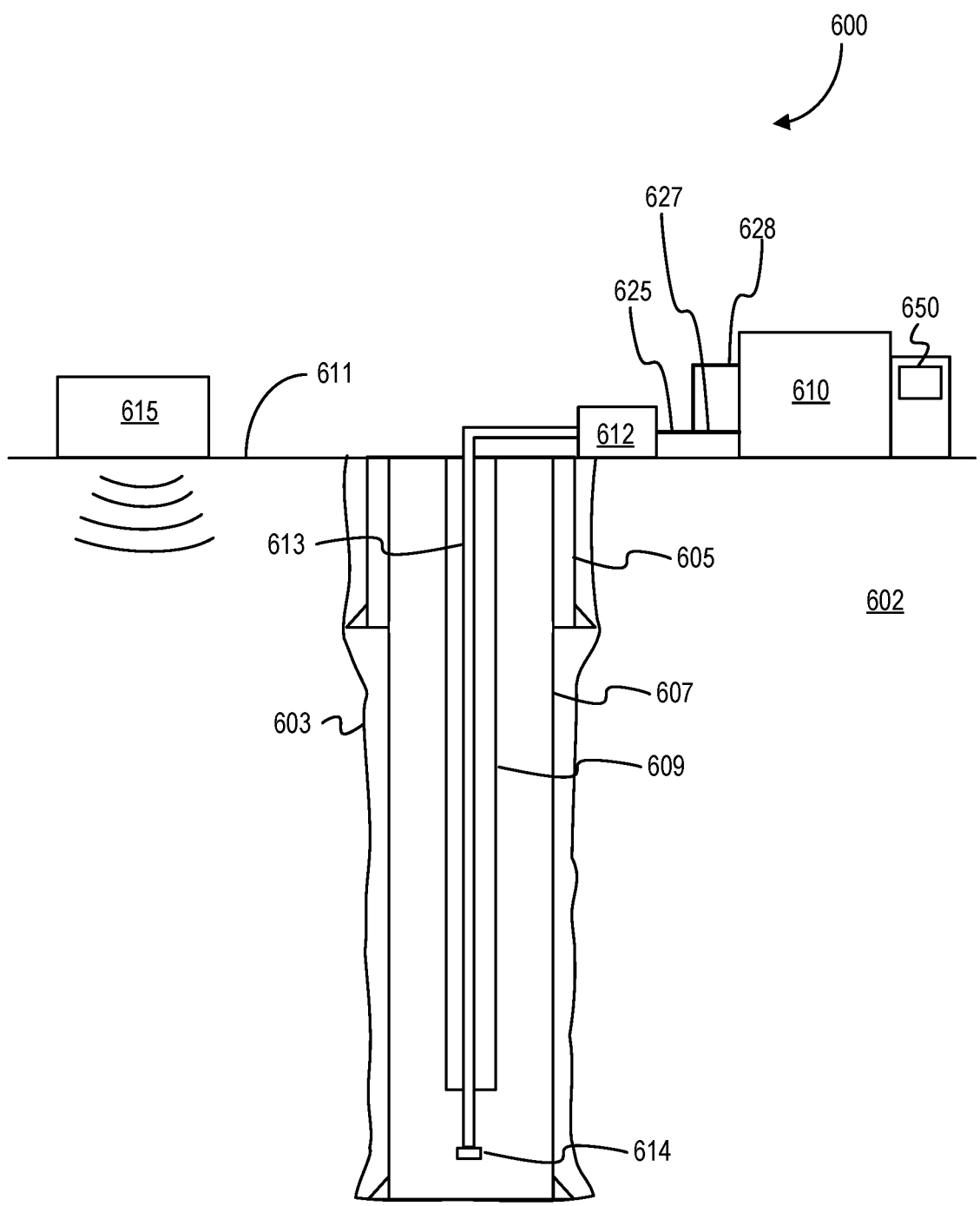
FIG. 6 is an elevation view of an onshore borehole that includes a simultaneous DAS signal acquisition system connected to an optical fiber within the tubing of a cased borehole.

FIG. 6 is an elevation view of an onshore borehole that includes a simultaneous DAS signal acquisition system connected to an optical fiber within the tubing of a cased borehole. A borehole 603 in the subterranean formation 602 includes a DAS system 600 that can detect seismic disturbances generated by a seismic source 615 on an earth surface 611. The borehole 603 can be a completion well (i.e. a well ready for production or injection following a drilling process) having a surface casing 605, a production casing 607 inside the surface casing 605, and a tubing 109 inside the production casing 107. In some embodiments, the tubing 609 can be a casing string, production string, an armored wireline, a slickline, a coiled tubing, a work string, etc. The DAS system 600 includes an optical fiber 613 in the tubing 609 and a DAS signal interrogation system 612 that includes a DAS interrogator.

In some embodiments, the DAS interrogator in the DAS signal interrogation system 612 can be directly coupled to the optical fiber 613. Alternatively, the DAS interrogator can be coupled to a fiber stretcher module in the DAS signal interrogation system 612, wherein the fiber stretcher module is coupled to the optical fiber 613. The DAS signal interrogation system 612 can receive DAS measurement values taken from and/or transmitted along the length of the optical fiber 613. In addition, the DAS signal interrogation system 612 can receive DAS measurement values from a bottom hole gauge carrier 614 attached to the bottom of the optical fiber 613 that transmits measurements through the optical fiber 613. In some embodiments, the bottom hole gauge carrier 614 can include a pressure temperature gauge and can be inside of or replaced by a wireline tool, formation testing tool, etc.

DAS measurement values transmitted through the optical fiber 613 can be sent to the DAS signal interrogation system 612 at the surface. The DAS interrogator of the DAS signal interrogation system 612 can be electrically connected to a digitizer to convert optically-transmitted measurements into digitized measurements. A computing device 610 can collect the digitized measurements from the DAS signal interrogation system 612 using a connector 625. The computing device can have one or more processors and a memory device to analyze the measurements and graphically represent analysis results on the display device 650. In addition, the computing device 610 can communicate with components attached to the optical fiber 613. For example, the computing device 610 can send control signals to the bottom hole gauge carrier 614 to modify gauge measurement parameters. Additionally, in some embodiments, at least one processor and memory device can be located downhole for the same purposes. With the optical fiber 613 positioned inside a portion of the wellbore 603, the DAS signal interrogation system 612 can obtain information associated with the subterranean formation 602 based on seismic/acoustic disturbances (e.g. seismic disturbances caused by the seismic source 615). Relative to other positions, fixing the optical fiber 613 to the outer perimeter of the tubing 609 can increase the sensitivity of DAS measurements to changes in the annular region between the production casing 607 and the tubing 609. (e.g. changes in fluid flow down the tubing 609, changes in fluid composition down the tubing 609, etc.).

The connector 625 includes a first connector output 627 and a second connector output 628. The first connector output 627 electrically connects the DAS signal interrogation system 612 to a first digitizer in the computing device 610. The second connector output 628 electrically connects the DAS signal interrogation system 612 to a second digitizer in the computing device 610. A signal transmitted by or through the optical fiber 613 in the tubing 609 can be simultaneously received by both the first digitizer and the second digitizer in the computing device 610. In alternative embodiments, the first digitizer and the second digitizer can be in separate computing devices.

Figure 7:
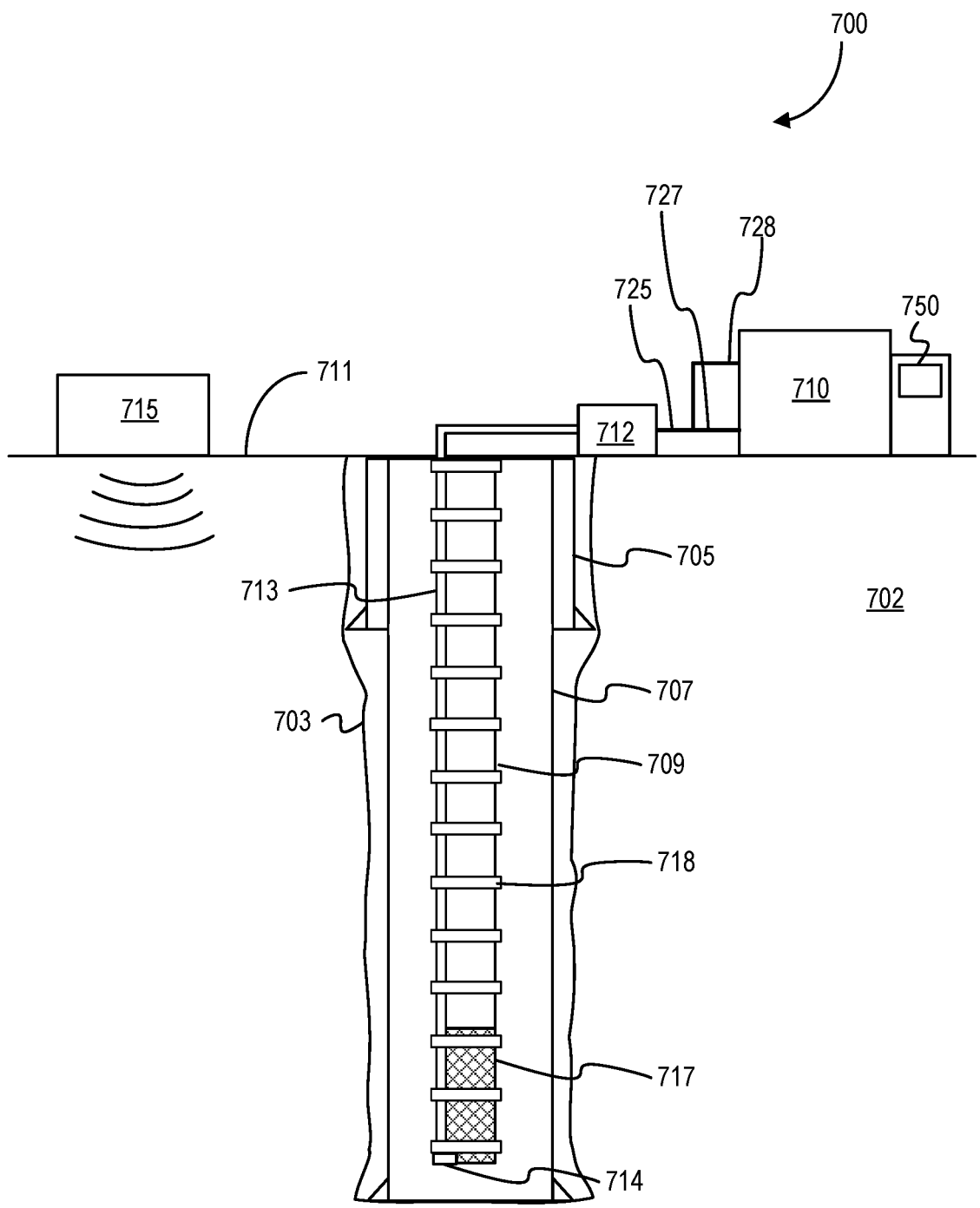
FIG. 7 is an elevation view of an onshore borehole that includes a simultaneous DAS signal acquisition system connected to an optical fiber fixed to the outside of the tubing of a cased borehole.

FIG. 7 is an elevation view of an onshore borehole that includes a simultaneous DAS signal acquisition system connected to an optical fiber fixed to the outside of the tubing of a cased borehole. A borehole 703 in the subterranean formation 702 includes a DAS system 700 that can detect seismic disturbances generated by a seismic source 715 on an earth surface 711. The borehole 703 can be a completion well (i.e. a well ready for production or injection following a drilling process) having a surface casing 705, a production casing 707 inside the surface casing 705, and a tubing 709 inside the production casing 707. In some embodiments, the tubing 709 can be a casing string, production string, an armored wireline, a slickline, a coiled tubing, a work string, etc. The DAS system 700 includes an optical fiber 713 that is fixed to the outer perimeter of the tubing 709. Cross-coupling protectors such as a cross-coupling protector 718 can be used to fix the optical fiber 713 to the tubing 709. In addition, a tubing tail 717 can also be fixed to the optical fiber 713 and extend below the bottom of the tubing 709.

In some embodiments, the optical fiber can be connected to a DAS signal interrogation system 712 that includes a DAS interrogator. The DAS interrogator in the DAS signal interrogation system 712 can be directly coupled to the optical fiber 713. Alternatively, the DAS interrogator can be coupled to a fiber stretcher module in the DAS signal interrogation system 712, wherein the fiber stretcher module is coupled to the optical fiber 713. The DAS signal interrogation system 712 can receive DAS measurement values taken from and/or transmitted along the length of the optical fiber 713. In addition, the DAS signal interrogation system 712 can receive DAS measurement values from a bottom hole gauge carrier 714 attached to the bottom of the optical fiber 713 that transmits measurements through the optical fiber 713. In some embodiments, the bottom hole gauge carrier 714 can include a pressure temperature gauge and can be inside of or replaced by a wireline tool, formation testing tool, etc.

DAS measurement values transmitted through the optical fiber 713 can be sent to the DAS signal interrogation system 712 at the surface. The DAS interrogator of the DAS signal interrogation system 712 can be electrically connected to a digitizer to convert optically-transmitted measurements into digitized measurements. A computing device 710 can collect the digitized measurements from the DAS signal interrogation system 712 using a connector 725. The computing device can have one or more processors and a memory device to analyze the measurements and graphically represent analysis results on the display device 750. In addition, the computing device 710 can communicate with components attached to the optical fiber 713. For example, the computing device 710 can send control signals to the bottom hole gauge carrier 714 to modify gauge measurement parameters. Additionally, in some embodiments, at least one processor and memory device can be located downhole for the same purposes. With the optical fiber 713 positioned inside a portion of the wellbore 703, the DAS signal interrogation system 712 can obtain information associated with the subterranean formation 702 based on seismic/acoustic disturbances (e.g. seismic disturbances caused by the seismic source 715). Relative to other positions, fixing the optical fiber 713 to the outer perimeter of the tubing 709 can increase the sensitivity of DAS measurements to changes in the annular region between the production casing 707 and the tubing 709.

The connector 725 includes a first connector output 727 and a second connector output 728. The first connector output 727 electrically connects the DAS signal interrogation system 612 to a first digitizer in the computing device 710. The second connector output 728 electrically connects the DAS signal interrogation system 612 to a second digitizer in the computing device 710. A signal transmitted by or through the optical fiber 713 fixed to the outer perimeter of the tubing 709 can be simultaneously received by both the first digitizer and the second digitizer in the computing device 710. In alternative embodiments, the first digitizer and the second digitizer can be separate computing devices.

Figure 8:
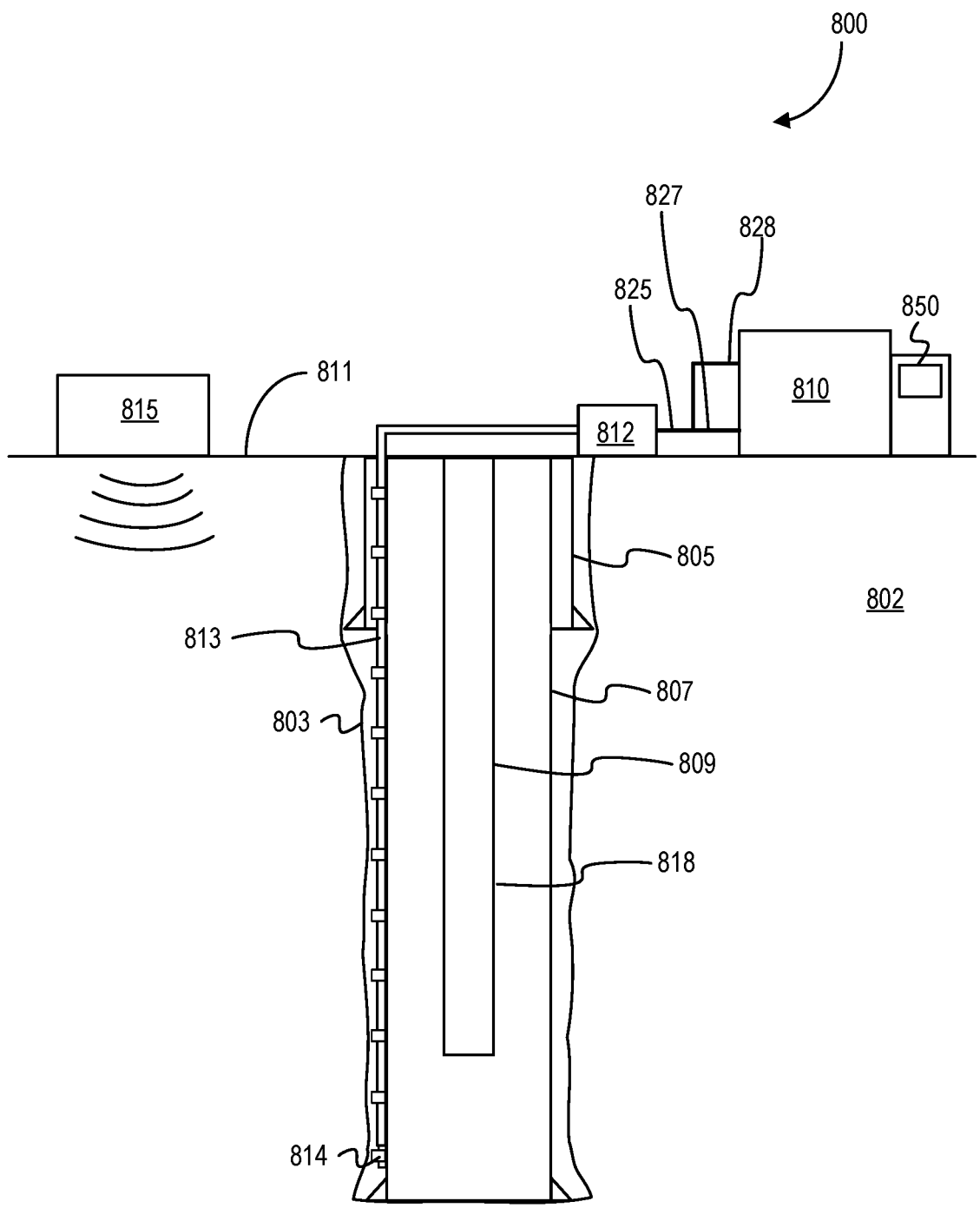
FIG. 8 is an elevation view of an onshore borehole that includes a simultaneous DAS signal acquisition system connected to an optical fiber fixed to the outside of the production casing of a cased borehole.

FIG. 8 is an elevation view of an onshore borehole that includes a simultaneous DAS signal acquisition system connected to an optical fiber fixed to the outside of the production casing of a cased borehole. A borehole 803 in the subterranean formation 802 includes a DAS system 800 that can detect seismic disturbances generated by a seismic source 815 on an earth surface 811. The borehole 803 can be a completion well (i.e. a well ready for production or injection following a drilling process) having a surface casing 805, a production casing 807 inside the surface casing 805, and a tubing 809 inside the production casing 807. In some embodiments, the tubing 809 can be a casing string, production string, an armored wireline, a slickline, a coiled tubing, a work string, etc. The DAS system 800 includes an optical fiber 813 that is fixed to the outer perimeter of the production casing 809. Cross-coupling protectors such as a cross-coupling protector 818 can be used to fix the optical fiber 813 to the outer perimeter of the production casing 809.

In some embodiments, the optical fiber can be connected to a DAS signal interrogation system 812 that includes a DAS interrogator. The DAS interrogator in the DAS signal interrogation system 812 can be directly coupled to the optical fiber 813. Alternatively, the DAS interrogator can be coupled to a fiber stretcher module in the DAS signal interrogation system 812, wherein the fiber stretcher module is coupled to the optical fiber 813. The DAS signal interrogation system 812 can receive DAS measurement values taken from and/or transmitted along the length of the optical fiber 813. In addition, the DAS signal interrogation system 812 can receive DAS measurement values from a bottom hole gauge carrier 814 attached to the bottom of the optical fiber 813 that transmits measurements through the optical fiber 813. In some embodiments, the bottom hole gauge carrier 814 can be attached to the bottom of the optical fiber 613 and can include a pressure temperature gauge and can be inside of or replaced by a wireline tool, formation testing tool, etc.

DAS measurement values transmitted through the optical fiber 813 can be sent to the DAS signal interrogation system 812 at the surface. The DAS interrogator of the DAS signal interrogation system 812 can be electrically connected to a digitizer to convert optically-transmitted measurements into digitized measurements. A computing device 810 can collect the digitized measurements from the DAS signal interrogation system 812 using a connector 825. The computing device can have one or more processors and a memory device to analyze the measurements and graphically represent analysis results on the display device 850. In addition, the computing device 810 can communicate with components attached to the optical fiber 813. For example, the computing device 810 can send control signals to the bottom hole gauge carrier 814 to modify gauge measurement parameters. Additionally, in some embodiments, at least one processor and memory device can be located downhole for the same purposes. With the optical fiber 813 positioned inside a portion of the wellbore 803, the DAS signal interrogation system 812 can obtain information associated with the subterranean formation 802 based on seismic/acoustic disturbances (e.g. seismic disturbances caused by the seismic source 815). Relative to other positions, fixing the optical fiber 813 to the outer perimeter of the production casing 809 can increase the sensitivity of DAS measurements to changes in the formation.

The connector 825 includes a first connector output 827 and a second connector output 828. The first connector output 827 electrically connects the DAS signal interrogation system 612 to a first digitizer in the computing device 810. The second connector output 828 electrically connects the DAS signal interrogation system 612 to a second digitizer in the computing device 810. A signal transmitted by or through the optical fiber 813 fixed to the production casing 809 can be simultaneously received by both the first digitizer and the second digitizer in the computing device 810. In alternative embodiments, the first digitizer and the second digitizer can be separate computing devices.

Example Computing System

Figure 9:
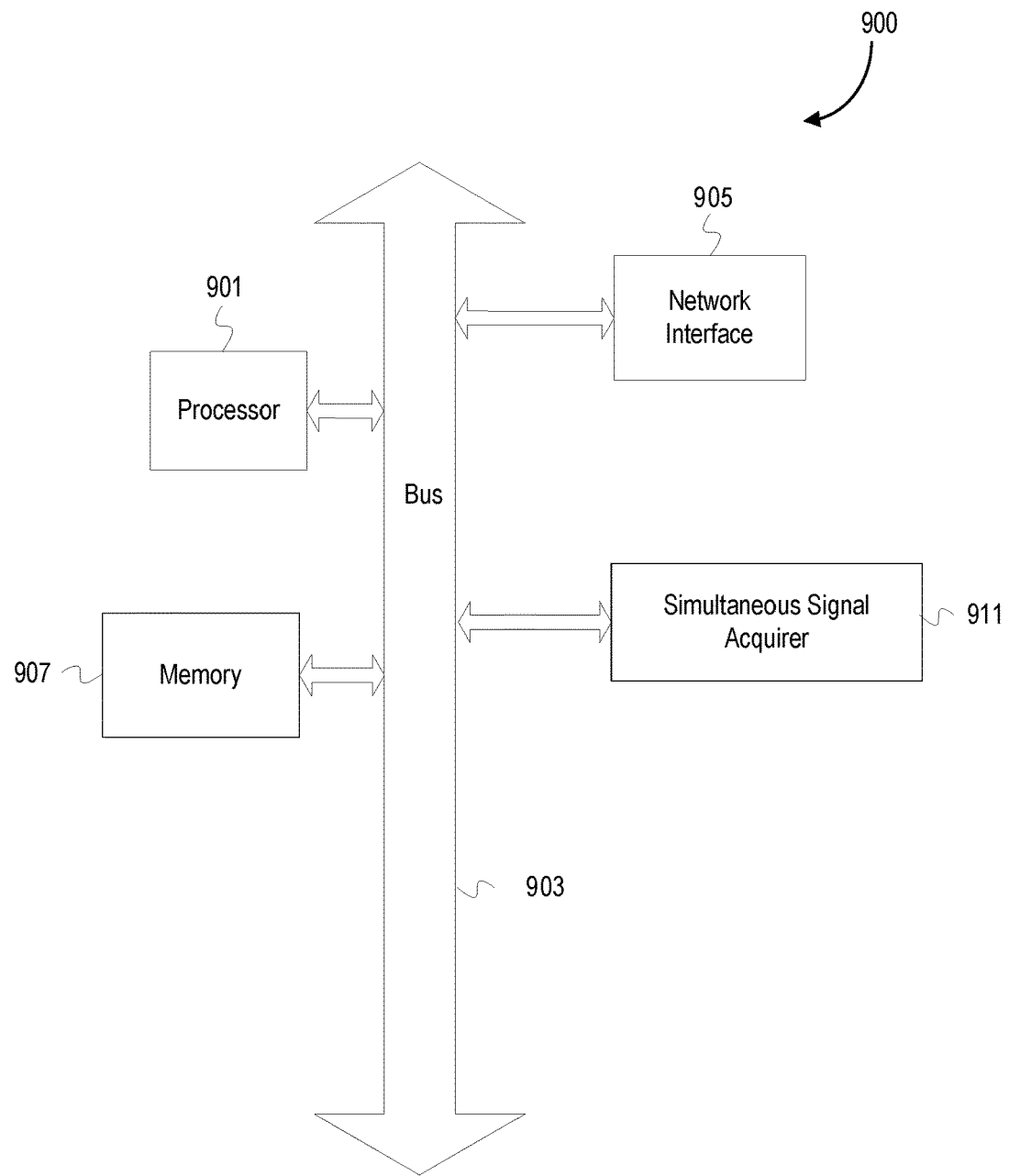
FIG. 9 depicts a computer device.

FIG. 9 depicts a computer device. A computer device 900 includes a processor 901 (possibly including multiple processors, multiple cores, multiple nodes, and/or implementing multi-threading, etc.). The computer device 900 includes a memory 907. The memory 907 can be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer device 900 also includes a bus 903 (e.g., PCI, ISA, PCI-Express, HyperTransport® bus, InfiniBand® bus, NuBus, etc.) and a network interface 905 (e.g., a Fiber Channel interface, an Ethernet interface, an internet small computer system interface, SONET interface, wireless interface, etc.).

In some embodiments, the computer device 900 includes a simultaneous signal acquirer 911. The simultaneous signal acquirer 911 can perform one or more operations for receiving and processing DAS signals at multiple digitizers from a single DAS interrogator, including operations to process different sets of digitized DAS signals generated from a same set of analog DAS signals. Any one of the previously described functionalities can be partially (or entirely) implemented in hardware and/or on the processor 901. For example, the functionality can be implemented with an application specific integrated circuit, in logic implemented in the processor 901, in a co-processor on a peripheral device or card, etc. Further, realizations can include fewer or additional components not illustrated in FIG. 9 (e.g., video cards, audio cards, additional network interfaces, peripheral devices, etc.). The processor 901 and the network interface 905 are coupled to the bus 903. Although illustrated as being coupled to the bus 903, the memory 907 can be coupled to the processor 901.

As will be appreciated, aspects of the disclosure can be embodied as a system, method or program code/instructions stored in one or more machine-readable media. Accordingly, aspects can take the form of hardware, software (including firmware, resident software, micro-code, etc.), or a combination of software and hardware aspects that can all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) can be utilized. The machine-readable medium can be a machine-readable signal medium or a machine-readable storage medium. A machine-readable storage medium can be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium can be any tangible medium that can contain, or store a program for use by or in connection with an instruction execution system, apparatus, or device. A machine-readable storage medium is not a machine-readable signal medium.

A machine-readable signal medium can include a propagated data signal with machine readable program code embodied therein, for example, in baseband or as part of a carrier wave. Such a propagated signal can take any of a variety of forms, including, but not limited to, electromagnetic, optical, or any suitable combination thereof. A machine-readable signal medium can be any machine readable medium that is not a machine-readable storage medium and that can communicate, propagate, or transport a program for use by or in connection with an instruction execution system, apparatus, or device.

Program code embodied on a machine-readable medium can be transmitted using any appropriate medium, including but not limited to wireless, wireline, optical fiber cable, RF, etc., or any suitable combination of the foregoing.

Computer program code for carrying out operations for aspects of the disclosure can be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code can execute entirely on a stand-alone machine, can execute in a distributed manner across multiple machines, and can execute on one machine while providing results and or accepting input on another machine.

The program code/instructions can also be stored in a machine-readable medium that can direct a machine to function in a particular manner, such that the instructions stored in the machine-readable medium produce an article of manufacture including instructions which implement the function/act specified in the flowchart and/or block diagram block or blocks.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed. Use of the term "set" can mean one or more than one. The phrase "a set of DAS signals" can be infringed with only one single DAS signal or multiple DAS signals. Use of the term "subset" can include the entirety of a set. The phrase "subset of a set of DAS signals" can be infringed with only one signal of the set of DAS signals, multiple signals of the set of DAS signals, or all of the signals of the set of DAS signals.

EXAMPLE EMBODIMENTS

Example embodiments include the following:

Embodiment 1: An apparatus comprising: a distributed acoustic sensing (DAS) optical fiber; a DAS interrogator coupled to the DAS optical fiber; a connector, wherein the connector communicatively couples the DAS interrogator, a first digitizer, and a second digitizer, wherein the first digitizer is to generate a first digitized DAS signal based on an analog DAS signal transmitted from the DAS interrogator, and wherein the second digitizer is to generate a second digitized DAS signal based on the analog DAS signal; one or more processors; and a machine-readable medium having program code executable by the one or more processors to cause the apparatus to, simultaneously generate a first set of values that correlate with a first physical property based on the first digitized DAS signal and generating a second set of values that correlate with a second physical property based on the second digitized DAS signal.

Embodiment 2: The apparatus of Embodiment 1, wherein the first digitizer is communicatively coupled to a first processor of the one or more processors, and wherein the second digitizer is communicatively coupled to a second processor of the one or more processors.

Embodiment 3: The apparatus of Embodiments 1 or 2, wherein the DAS interrogator is unlocked with respect to a first computing device having the first processor, and wherein the DAS interrogator is locked with respect to a second computing device having the second processor.

Embodiment 4: The apparatus of any of Embodiments 1-3, wherein the connector communicatively couples the DAS interrogator to a third digitizer.

Embodiment 5: The apparatus of any of Embodiments 1-4, further comprising: a first display device to display the first set of values; and a second display device to display the second set of values.

Embodiment 6: The apparatus of any of Embodiments 1-5, further comprising a clock sync system, wherein the clock sync system is communicatively coupled to the first digitizer, the second digitizer, and a first processor of the one or more processors.

Embodiment 7: The apparatus of any of Embodiments 1-6, further comprising a fiber stretcher module communicatively coupled to the DAS interrogator.

Embodiment 8: A method to simultaneously acquire distributed acoustic sensing (DAS) signals comprising: generating a first digitized DAS signal using a first digitizer, wherein the first digitized DAS signal is based on an analog DAS signal from a DAS interrogator, and wherein the analog DAS signal is transmitted to the first digitizer using a connector; and generating a second digitized DAS signal using a second digitizer, wherein the second digitized DAS signal is based on the analog DAS signal from the DAS interrogator, and wherein the analog DAS signal is transmitted to the second digitizer using the connector, and wherein generating the first digitized DAS signal and the second digitized DAS signal is simultaneous; and simultaneously generating a first set of values that correlate with a first physical property based on the first digitized DAS signal and generating a second set of values that correlate with a second physical property based on the second digitized DAS signal.

Embodiment 9: The method of Embodiment 8, further comprising: simultaneously displaying the first set of values on a first display screen and the second set of values on a second display screen, wherein generating the first set of values comprises generating the first set of values using a first processor that is communicatively coupled to the first digitizer, and wherein generating the second set of values comprises generating the second set of values using a second processor that is communicatively coupled to the second digitizer.

Embodiment 10: The method of Embodiments 8 or 9, further comprising: transmitting instructions to the DAS interrogator from the first processor; and locking the DAS interrogator with respect to a device comprising the second processor.

Embodiment 11: The method of any of Embodiments 8-10, further comprising: generating a third digitized DAS signal, wherein the third digitized DAS signal is based on the analog DAS signal from the DAS interrogator transmitted through the connector, and wherein the analog DAS signal is transmitted to the first digitizer using the connector; and generating a third set of values that correlate with a third physical property based on the third digitized DAS signal using a third processor.

Embodiment 12: The method of any of Embodiments 8-11, further comprising synchronizing the first digitized DAS signal and the second digitized DAS signal into a set of synchronized signals using a clock sync system.

Embodiment 13: The method of any of Embodiments 8-12, further comprising: simultaneously displaying the first set of values on a first display screen and the second set of values on the first display screen, wherein generating the first set of values comprises generating the first set of values based on the first digitized DAS signal using a first processor, and wherein generating the second set of values comprises generating the second set of values based on the second digitized DAS signal using the first processor.

Embodiment 14: The method of any of Embodiments 8-13, further comprising: determining a first gauge length limit based on the first physical property; determining a second gauge length limit based on the second physical property; and selecting a gauge length for the DAS interrogator that is between the first gauge length limit and the second gauge length limit.

Embodiment 15: A well system comprising: a distributed acoustic sensing (DAS) optical fiber disposed downhole; a DAS interrogator coupled to the DAS optical fiber; a connector, wherein the connector communicatively couples the DAS interrogator, a first digitizer, and a second digitizer, wherein the first digitizer is to generate a first digitized DAS signal based on an analog DAS signal transmitted from the DAS interrogator, and wherein the second digitizer is to generate a second digitized DAS signal based on the analog DAS signal; one or more processors; and a machine-readable medium having program code executable by the one or more processors to cause the well system to, simultaneously generate a first set of values that correlate with a first physical property based on the first digitized DAS signal and generating a second set of values that correlate with a second physical property based on the second digitized DAS signal.

Embodiment 16: The well system of Embodiment 15, wherein the first digitizer is communicatively coupled to a first processor of the one or more processors, and wherein the second digitizer is communicatively coupled to a second processor of the one or more processors.

Embodiment 17: The well system of Embodiments 15 or 16, wherein the connector communicatively couples the DAS interrogator to a third digitizer.

Embodiment 18: The well system of any of Embodiments 15-17, further comprising: a first display device to display the first set of values; and a second display device to display the second set of values.

Embodiment 19: The well system of any of Embodiments 15-18, wherein the program code executable by the one or more processors further comprises program code to: determining a first gauge length limit based on the first physical property; determining a second gauge length limit based on the second physical property; and selecting a gauge length for the DAS interrogator that is between the first gauge length limit and the second gauge length limit.

Embodiment 20: The well system of any of Embodiments 15-19, wherein the program code executable by the one or more processors further comprises program code to determine an optical pulse repetition speed based on a signal to noise ratio threshold, wherein a signal to noise ratio of the first digitized DAS signal is greater than the signal to noise ratio threshold.

What is claimed is:

1. An apparatus comprising:
a distributed acoustic sensing (DAS) optical fiber;
a DAS interrogator coupled to the DAS optical fiber;
a connector, wherein the connector communicatively couples the DAS interrogator, a first digitizer, and a second digitizer, wherein the first digitizer is to generate a first digitized DAS signal based on an analog DAS signal transmitted from the DAS interrogator, and wherein the second digitizer is to generate a second digitized DAS signal based on the same analog DAS signal;
one or more processors; and
a machine-readable medium having program code executable by the one or more processors to cause the apparatus to,
simultaneously generate a first set of values that correlate with a first physical property based on the first digitized DAS signal and generating a second set of values that correlate with a second physical property based on the second digitized DAS signal.

2. The apparatus of claim 1, wherein the first digitizer is communicatively coupled to a first processor of the one or more processors, and wherein the second digitizer is communicatively coupled to a second processor of the one or more processors.

3. The apparatus of claim 2, wherein the DAS interrogator is unlocked with respect to a first computing device having the first processor, and wherein the DAS interrogator is locked with respect to a second computing device having the second processor.

4. The apparatus of claim 1, wherein the connector communicatively couples the DAS interrogator to a third digitizer.

5. The apparatus of claim 1, further comprising:
a first display device to display the first set of values; and
a second display device to display the second set of values.

6. The apparatus of claim 1, further comprising a clock sync system, wherein the clock sync system is communicatively coupled to the first digitizer, the second digitizer, and a first processor of the one or more processors.

7. The apparatus of claim 1, further comprised a fiber stretcher module communicatively coupled to the DAS interrogator.

8. A method to simultaneously acquire distributed acoustic sensing (DAS) signals comprising:
generating a first digitized DAS signal using a first digitizer, wherein the first digitized DAS signal is based on an analog DAS signal from a DAS interrogator, and wherein the analog DAS signal is transmitted to the first digitizer using a connector; and
generating a second digitized DAS signal using a second digitizer, wherein the second digitized DAS signal is based on the same analog DAS signal from the DAS interrogator, and wherein the analog DAS signal is transmitted to the second digitizer using the connector, and wherein generating the first digitized DAS signal and the second digitized DAS signal is simultaneous; and
simultaneously generating a first set of values that correlate with a first physical property based on the first digitized DAS signal and generating a second set of values that correlate with a second physical property based on the second digitized DAS signal.

9. The method of claim 8, further comprising simultaneously displaying the first set of values on a first display screen and the second set of values on a second display screen, wherein generating the first set of values comprises generating the first set of values using a first processor that is communicatively coupled to the first digitizer, and wherein generating the second set of values comprises generating the second set of values using a second processor that is communicatively coupled to the second digitizer.

10. The method of claim 9, further comprising:
transmitting instructions to the DAS interrogator from the first processor; and
locking the DAS interrogator with respect to a device comprising the second processor.

11. The method of claim 8, further comprising:
generating a third digitized DAS signal, wherein the third digitized DAS signal is based on the analog DAS signal from the DAS interrogator transmitted through the connector, and wherein the analog DAS signal is transmitted to the first digitizer using the connector; and
generating a third set of values that correlate with a third physical property based on the third digitized DAS signal using a third processor.

12. The method of claim 8, further comprising synchronizing the first digitized DAS signal and the second digitized DAS signal into a set of synchronized signals using a clock sync system.

13. The method of claim 12, further comprising:
simultaneously displaying the first set of values on a first display screen and the second set of values on the first display screen, wherein generating the first set of values comprises generating the first set of values based on the first digitized DAS signal using a first processor, and wherein generating the second set of values comprises generating the second set of values based on the second digitized DAS signal using the first processor.

14. The method of claim 8, further comprising:
determining a first gauge length limit based on the first physical property;
determining a second gauge length limit based on the second physical property; and
selecting a gauge length for the DAS interrogator that is between the first gauge length limit and the second gauge length limit.

15. A well system comprising:
a distributed acoustic sensing (DAS) optical fiber disposed downhole;
a DAS interrogator coupled to the DAS optical fiber;
a connector, wherein the connector communicatively couples the DAS interrogator, a first digitizer, and a second digitizer, wherein the first digitizer is to generate a first digitized DAS signal based on an analog DAS signal transmitted from the DAS interrogator, and wherein the second digitizer is to generate a second digitized DAS signal based on the same analog DAS signal;
one or more processors; and
a machine-readable medium having program code executable by the one or more processors to cause the well system to,
simultaneously generate a first set of values that correlate with a first physical property based on the first digitized DAS signal and generating a second set of values that correlate with a second physical property based on the second digitized DAS signal.

16. The well system of claim 15, wherein the first digitizer is communicatively coupled to a first processor of the one or more processors, and wherein the second digitizer is communicatively coupled to a second processor of the one or more processors.

17. The well system of claim 15, wherein the connector communicatively couples the DAS interrogator to a third digitizer.

18. The well system of claim 15, further comprising:
a first display device to display the first set of values; and
a second display device to display the second set of values.

19. The well system of claim 15, wherein the program code executable by the one or more processors further comprises program code to:
determining a first gauge length limit based on the first physical property;
determining a second gauge length limit based on the second physical property; and
selecting a gauge length for the DAS interrogator that is between the first gauge length limit and the second gauge length limit.

20. The well system of claim 15, wherein the program code executable by the one or more processors further comprises program code to determine an optical pulse repetition speed based on a signal to noise ratio threshold, wherein a signal to noise ratio of the first digitized DAS signal is greater than the signal to noise ratio threshold.

* * * * *